United States Patent [19]

Kawai et al.

[11] 3,893,964
[45] July 8, 1975

[54] BINDER FOR FOUNDRY SAND

[75] Inventors: Hirotaka Kawai, Osaka; Hidetsugu Takenaka, Arita; Osamu Yamamoto, Wakayama, all of Japan

[73] Assignee: Kao Soap Co., Ltd., Tokyo, Japan

[22] Filed: Aug. 24, 1973

[21] Appl. No.: 391,267

[30] Foreign Application Priority Data
Aug. 30, 1972 Japan.............................. 47-86848

[52] U.S. Cl........... 260/29.4 R; 164/43; 260/39 SB; 260/DIG. 41; 260/69 R
[51] Int. Cl............................................. C08g 51/24
[58] Field of Search.... 260/29.4 R, 39 SB, DIG. 40, 260/69 R; 164/43

[56] References Cited
UNITED STATES PATENTS

| | | | |
|---|---|---|---|
| 2,876,062 | 3/1959 | Torke et al. | 260/67.5 |
| 2,978,359 | 4/1961 | Wedell | 260/29.4 R |
| 3,471,429 | 10/1969 | Hayford | 260/39 SB |
| 3,709,849 | 1/1973 | Lemon | 260/29.3 |

*Primary Examiner*—Lorenzo B. Hayes
*Attorney, Agent, or Firm*—Woodhams, Blanchard and Flynn

[57] ABSTRACT

A fluid, acid-hardening binder for foundry sand which is a resinous composition comprising 2.5–55 wt. % of composition (I), 30–95 wt. % of furfuryl alcohol and less than 40 wt. % of water, said composition (I) being obtained by reacting urea, glyoxal and formaldehyde under such conditions that the total number of moles of aldehyde groups, per mole of urea, is 2–4, the proportion of glyoxal aldehyde groups to the total aldehyde groups is 10–60%, the number of moles of glyoxal does not exceed the number of moles of urea and the number of moles of formaldehyde does not exceed 2.5 times the number of moles of urea.

5 Claims, No Drawings

BINDER FOR FOUNDRY SAND

BACKGROUND OF THE INVENTION

1. Field of the Invention

The present invention relates to an acid-hardening binder for foundry sand comprising urea-glyoxal-formaldehyde resin which emits little formaldehyde odor.

2. Description of the Prior Art

Various binders for foundry sand have been proposed and many of them have been used with generally satisfactory results depending upon the size, scale of production, shape and material of the castings. Although urea-formaldehyde resins and urea-formaldehyde resin compositions containing furfuryl alcohol have been known as binders for foundry sand (for example, see Japanese Patent Publication No. 1543/1964), they have the disadvantage that they emit a strong formaldehyde odor. It is required to reduce this odor in order to improve working conditions in the foundry and to reduce air pollution.

SUMMARY OF THE INVENTION

We have discovered that a resin composition comprising (A) a compound obtained by reacting urea, glyoxal and formaldehyde in critical proportions, mixed with (B) furfuryl alcohol and (C) water, is an excellent binder for foundry sand and that hardly any formaldehyde odor is emitted during the casting operation. The present invention has been attained on the basis of this discovery.

The reaction of urea, glyoxal and formaldehyde is known, and is disclosed, for example, in Japanese Patent Publication No. 545/1962. The products of this reaction are used generally for the treatment of fibers. The reaction mechanism and precise analysis of the reaction products have not been elucidated yet.

It is surprising that, when a resin composition comprising urea-glyoxal-formaldehyde resin, furfuryl alcohol and water is used as binder for foundry sand, there is obtained the remarkable combination of properties that (1) little formaldehyde odor is emitted and (2) the binder possesses adequate strength. It is considered generally that in the condensation polymerization of urea-formaldehyde resin, methylene ether bonds are formed, a part of which is decomposed by heat to yield methylene bond thereby producing formaldehyde. On the other hand, in the system containing glyoxal, it is considered that the formation of methylene ether bonds is inhibited by steric hindrance or by other causes, or the bond formed is difficulty decomposed, or formaldehyde formed once by the decomposition is hardly expelled out of the system due to re-reaction. The mechanism is thus still unclear.

The composition of the binder of the present invention will be described below. Referring first to the urea-glyoxal-formaldehyde composition, the critical proportions of the ingredients of this composition, according to the present invention, are defined by the following four items:

I. The total number of moles of aldehyde groups, per mole of urea, is 2–4.

II. The percentage of glyoxal aldehyde groups of the total aldehyde groups is 10–60%, preferably from 10–40%.

III. The number of moles of glyoxal does not exceed the number of moles of urea.

VI. The number of moles of formaldehyde does not exceed 2.5 times the number of moles of urea, preferably does not exceed 2.0 times the number of moles of urea.

Thus, the mol fractions of urea ($U$), glyoxal ($G$) and formaldehyde ($F$) have the following relations:

$$U + G + F = 1 \tag{1}$$

$$2 \leq (2G + F)/U \leq 4 \tag{2}$$

$$0.1 \leq 2G/(2G + F) \leq 0.6 \tag{3}$$

$$U/G \leq 1 \tag{4}$$

$$F/U \leq 2.5 \tag{5}$$

Preferred compositions of the urea-glyoxal-formaldehyde composition within the above general range are defined by the following formula (3)', used in place of formula (3), and the following formula (5)', used in place of formula (5):

$$0.1 \leq 2G/(2G + F) \leq 0.4 \tag{3'}$$

$$F/U \leq 2 \tag{5'}$$

with formulas (1), (2) and (4) remaining the same.

It has been confirmed, by experiments, that the above critical proportions must be employed in order to achieve the advantageous results that characterize this invention.

The order of mixing of the ingredients of the urea-glyoxal-formaldehyde composition within the above composition limitations, is not critical. The composition is preferably reacted under substantially neutral conditions of pH 4.5–7.5, preferably pH 6.5–7.5, at a temperature of 80–160°C, preferably 80–120°C for from about 30 minutes to 10 hours. The reaction should be continued until the amount of unreacted formaldehyde becomes to be less than 5 wt. %, preferably 3 wt. %, based on the amount of the entire reaction mixture.

The reaction may be effected in the presence of furfuryl alcohol and/or water in a necessary quantity which will be shown below.

The acid-hardening binder composition for foundry sand according to this invention consists essentially of A. From 2.5 to 55 percent by weight, based on the total weight of the binder composition, of the urea-glyoxal-formaldehyde composition described above.

B. From 30 to 95 percent by weight, based on the total weight of the binder composition, of furfuryl alcohol.

C. From 0 to 40 percent by weight, based on the total weight of the binder composition, of water.

If the binder contains less than 2.5 wt. %, of urea-glyoxal-formaldehyde composition the effect thereof as a binder is insufficient. Although furfuryl alcohol per se also reacts as a binder, the hardening velocity is insufficient. On the other hand, if the amount of the urea-glyoxal-formaldehyde composition is more than 55 wt. %, problems of fluidity, etc. occur during the operation. Water is not an essential ingredient of the binder composition but it may be present in an amount of up to 40 wt. % for the purpose of regulating fluidity or the like.

In the above urea-glyoxal-formaldehyde composition, the the three ingredients should be reacted until the content of unreacted formaldehyde in the reaction mixture, which may contain furfuryl alcohol, is lowered to less than 5 wt. %, preferably less than 3 wt. %. The existence or non-existence of furfuryl alcohol in the reaction mixture has no influence on the progress of the reaction. That is to say, furfuryl alcohol can be added to the urea-glyoxal-formaldehyde reaction product after the reaction has been completed or furfuryl alcohol can be added to a mixture of urea-glyoxal-formaldehyde as a solvent and then the mixture can be reacted. Thus, furfuryl alcohol does not interfere with the reaction of urea, glyoxal and formaldehyde.

In case urea, glyoxal and formaldehyde have been already reacted properly, furfuryl alcohol and water can be added to the urea-glyoxal-formaldehyde composition by simple blending. Since furfuryl alcohol has a reactivity with hydroxyl groups in the urea-glyoxal-formaldehyde resin molecules, a polymerization (condensation) reaction may be caused to occur, but no such polymerization will occur at room temperature as far as a catalyst is not present. No polymerization of furfuryl alcohol will occur even at a temperature of about 100°C and even if some of furfuryl alcohol would be reacted with the resin, it has no adverse effect on qualities of the binder composition according to the present invention.

In the preparation of a sand casting mold, a mixture of sand and an acid catalyst is blended with the binder composition of the invention comprising said urea-glyoxal-formaldehyde resin composition, furfuryl alcohol and water (optional) and molding is effected in the usual manner. The preferred acid catalysts are phosphoric acid and p-toluene-sulfonic acid (PTS). Other acid catalysts for furan resins can also be used. The optimum amount of such acid catalyst depends on the properties of sand, the kinds of resin, etc., but it is usually in the range of 10–100 wt. % based on the resin used. The amount of the binder composition of the invention employed is generally 1–3 wt. %, based on the weight of sand. This can be changed suitably depending upon the properties of the sand mold required.

EXAMPLE 1

Sand used:
  Fremantle (a product of Australia)
  Grain size distribution: (sieve test)

| Mesh (JIS) | +20 | −20 +28 | −28 +35 | −35 +48 | −48 +65 | −65 +100 |
|---|---|---|---|---|---|---|
| Wt. % | 1 | 13.2 | 20.8 | 37.8 | 13.6 | 3.2 |

Chemical composition:
  More than 99% $SiO_2$ and small quantities of $Al_2O_3$, $Fe_2O_3$, CaO and Mg.
Catalyst:
  85% $H_3PO_4$
Method of evaluation:
  2 Kg of sand were blended together with $16g^{-1}$ of the catalyst for 1 minute. The mixture was further blended together with 40 g of the binder for one minute.
  50 mm/diameter × 50 mm test piece was molded. The test piece was stored in a constant temperature, constant humidity room. At 30 minutes and 24 hours after the molding, the compression strength ($kg/cm^2$) of the test piece was measured.
Conditions of constant temperature room:
  Temperature: 25°C
  Humidity: 60%
Preparation of binder composition:
  Predetermined amounts of urea and formaldehyde were dissolved under alkaline condition with heating. A predetermined amount of 40% glyoxal aqueous solution was added thereto at pH 7 and the whole was stirred at 90°C for 2 hours. The mixture was then stirred together with a predetermined amount of furfuryl alcohol at pH 6 at 90°–100°C for 3 hours to obtain binder composition. Binder compositions A through K were prepared in this fashion and test pieces were prepared therefrom as described above. The contents of unreacted formaldehyde in the binder compositions were about 3% in No. D, while about 1–2% in Nos. C, F, G, H and K.

Composition of Binder Composition and Test Results

| No. | Quantity (g) | | | | | $H_2O$ % | Compression strength after 30 minutes ($kg/cm^2$) | Compression strength after 24 hours ($kg/cm^2$) |
|---|---|---|---|---|---|---|---|---|
| | U | 40%G | PF | FA | Total | | | |
| A*2 | 286 | 622 | 34 | 553 | 1495 | 25 | 0 | 13 |
| B*2 | 270 | 653 | 35 | 563 | 1521 | 26 | 0 | 11 |
| C | 150 | 363 | 177 | 405 | 1095 | 22 | 1 | 23 |
| D | 141 | 254 | 208 | 354 | 957 | 19 | 1 | 36 |
| E*2 | 135 | 73 | 256 | 272 | 736 | 11 | 4 | 42 |
| F | 165 | 55 | 243 | 272 | 735 | 10 | 5 | 24 |
| G | 193 | 52 | 227 | 277 | 749 | 9 | 5 | 25 |
| H | 207 | 49 | 219 | 279 | 754 | 8 | 5 | 38 |
| I*2 | 300 | 290 | 106 | 409 | 1105 | 17 | 0 | 41 |
| J*2 | 240 | 870 | 0 | 652 | 1762 | 30 | 0 | 7 |
| K | 195 | 109 | 212 | 303 | 819 | 12 | 5 | 49 |

(Note) U: urea, G: glyoxal, PF: paraformaldehyde, FA: furfuryl alcohol
The furfuryl alcohol content was adjusted to 37% in all cases, but the water content was not adjusted.
*1 Although the amount of catalyst that provides optimum results in the respective binders may be different, the tests were made employing the same amount of binder.
*2 A, B, E, I and J are the compositions not within the scope of the invention. Compositions A, B and I are unsuitable because of their low initial strength. Composition J is unsuitable because of its poor final strength. Composition E is also unsuitable, because it emits a strong formaldehyde odor, though it has sufficent strength.

The invention is further described by reference to the following illustrative examples, which are not limiting.

EXAMPLE 2

A commercially available binder Y (a resinous composition comprising urea-formaldehyde, furfuryl alcohol and water having a furfuryl alcohol content of 37% and a water content of 28%), was compared with a binder according to the invention (hereinafter referred to as K—H$_2$O) having a furfuryl alcohol content of 37% and a water content of 28% obtained by adding 7.5 g of furfuryl alcohol and 12.8 g of water to 100 g of composition No. K in Example 1. The strength and amount of formaldehyde evolved were measured. The method of measuring strength was the same as in Example 1.

The amount of formaldehyde evolved was measured according to the phenylhydrazine hydrochloride-potassium ferricyanide process after blending in a 4 liter closed mixer.

|   | Compression strength (kg/cm$^2$) | | Amount of formaldehyde evolved (ppm) | |
|---|---|---|---|---|
|   | After 30 minutes | after 24 hours | Directly after blending | after 10 minutes |
| Y | 2 | 37 | 195 | 199 |
| K-H$_2$O | 2 | 36 | 70 | 52 |

The results obtained by using 12 g of 70% paratoluene-sulfonic acid (PTS) in place of 16 g of 85% H$_3$PO$_4$ were as follows:

|   | Compression strength (kg/cm$^2$) | | Amount of formaldehyde evolved (ppm) | |
|---|---|---|---|---|
|   | After 30 minutes | after 24 hours | Directly after blending | after 10 minutes |
| Y | 2 | 38 | 227 | 145 |
| K-H$_2$O | 2 | 43 | 21 | 26 |

EXAMPLE 3

516 Grams of a composition comprising 195 g of urea, 109 g of 40% aqueous glyoxal solution and 212 g of paraformaldehyde were reacted with furfuryl alcohol and water in the following quantities. Test pieces were prepared and the strengths thereof were measured in the same manner as in Example 1 and the following results were obtained. The catalyst used was 70% PTS (16 g).

| No. | Amount of FA (g) | Amount of water (g) | Compression strength (kg/cm$^2$) | |
|---|---|---|---|---|
|   |   |   | after 30 minutes | After 24 hours |
| K$_1$ | 7748 | 112 | 2 | 40 |
| K$_2$ | 9423 | 531 | 1 | 47 |
| K$_3$ | 3769 | −97* | 6 | 66 |
| K$_4$ | 180 | −97* | 3 | 11 |
| K$_5$ | 152 | 93 | 1 | 3 |
| K$_6$ | 418 | 461 | 1 | 22 |
| K$_7$ | 1396 | 880 | 1 | 35 |

*The composition was dehydrated under vacuum to obtain anhydrous composition. K$_4$ and K$_5$ are not within the scope of this invention and they have only poor strength.

The embodiments of the invention in which an exclusive property or privilege is claimed are defined as follows:

1. A fluid, acid-hardening binder for foundry sand, consisting essentially of
    A. from 2.5 to 55 percent by weight, based on the total weight of the binder, of the reaction product of a urea-glyoxal-formaldehyde composition, in which
        1. the total number of moles of aldehyde groups, per one mole of urea, is from 2 to 4,
        2. the percentage of glyoxal aldehyde groups of the total aldehyde groups is from 10 to 60%,
        3. the number of moles of glyoxal does not exceed the number of moles of urea, and
        4. the number of moles of formaldehyde does not exceed 2.5 times the number of moles of urea, said reaction product containing less than 5 wt. % of unreacted formaldehyde,
    B. from 30 to 95 percent by weight, based on the total weight of the binder, of furfuryl alcohol, and
    C. from 0 to 40 percent by weight, based on the total weight of the binder, of water.

2. A binder according to claim 1, in which the percentage of glyoxal aldehyde groups of the total aldehyde groups is from 10 to 40%, and the number of moles of formaldehyde does not exceed 2.0 times the number of moles of urea.

3. A binder according to claim 1, in which the reaction product is obtained by reacting urea, glyoxal and formaldehyde under conditions of a pH 4.5 to 7.5, and at a temperature of 80° to 160°C until the content of unreacted formaldehyde in the reaction mixture is lowered to less than 5 wt. %.

4. A binder according to claim 1, in which the reaction product is obtained by reacting urea, glyoxal and formaldehyde under conditions of a pH of 6.5 to 7.5 and at a temperature of 80° to 120°C until the content of unreacted formaldehyde is lowered to less than 3 wt %.

5. A composition for a sand mold, consisting essentially of sand blended with
    from about one to 3 percent by weight, based on the weight of sand, of a binder according to claim 1, and an amount of acid catalyst effective for hardening said binder.

\* \* \* \* \*